Figure 1:
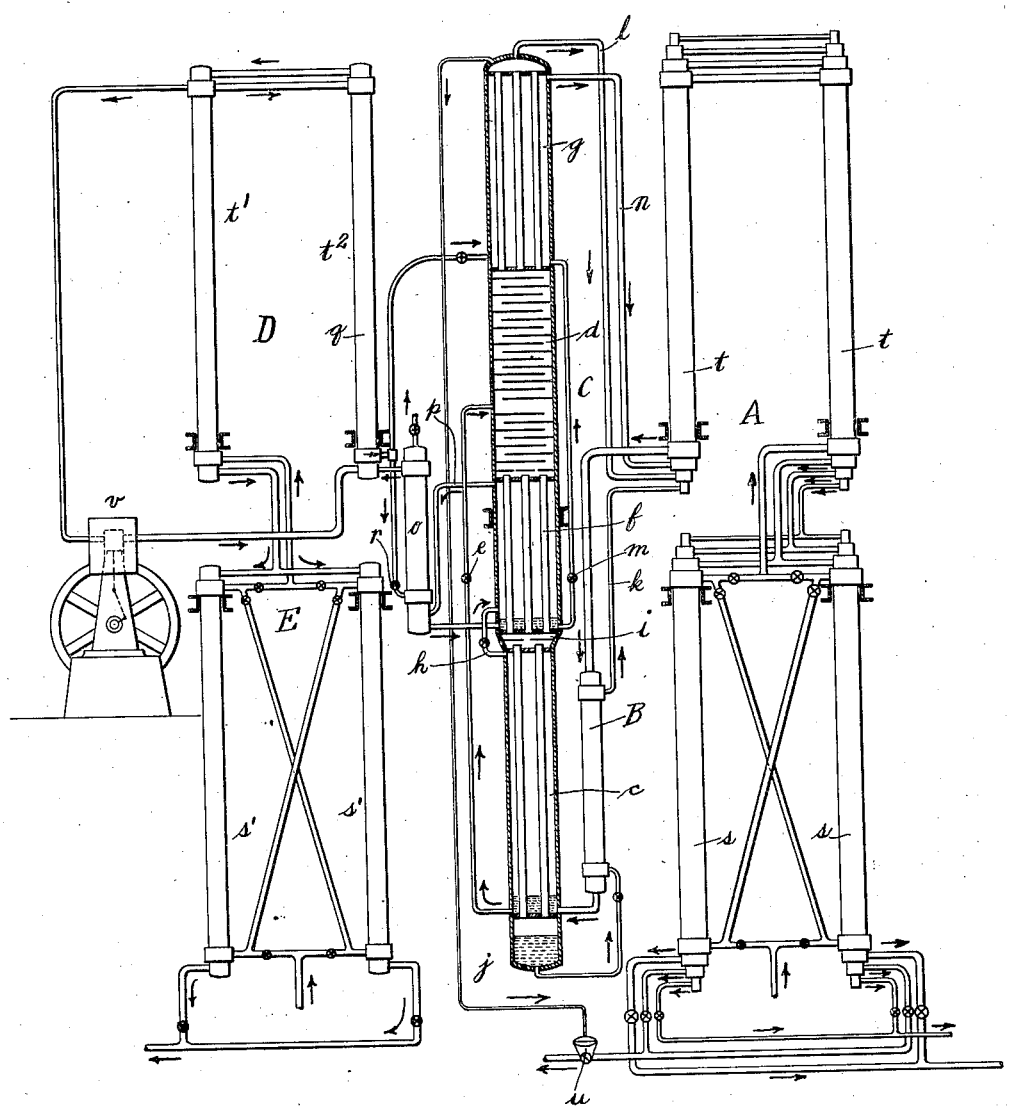

Nov. 3, 1931.  W. L. DE BAUFRE  1,830,157
SEPARATION OF MIXED GASES BY RECTIFICATION
Filed Jan. 3, 1927

INVENTOR
William L. De Baufre
BY
Synnestvedt & Lechner
ATTORNEYS

Patented Nov. 3, 1931

1,830,157

UNITED STATES PATENT OFFICE

WILLIAM L. DE BAUFRE, OF NEW YORK, N. Y.

SEPARATION OF MIXED GASES BY RECTIFICATION

Application filed January 3, 1927. Serial No. 158,475.

This invention relates to air separation by rectification, and it is primarily useful for the separation of oxygen, although the invention may either be employed in simultaneously producing both nitrogen and oxygen of satisfactory purity, or for producing nitrogen.

One of the principal objects of the present invention is to so reduce the cost of extracting oxygen from the air as to make it possible to commercially extend the uses to which oxygen may be put. Reduction in the cost of extracting oxygen is in itself desirable, and if, in addition, the cost be sufficiently lowered, oxygen could be used to advantage in the metallurgical field and in other arts.

It is another object of the invention to provide improvements in the art of liquefaction, which, while especially useful in connection with the general process herein described, are also capable of advantageous use in connection with existing systems and processes, and, with respect to such features of my invention, it is to be understood that they are not limited to employment only in a process such as here described.

Generally speaking, therefore, it is an object of the invention to reduce the power requirements of the system or process considered as a whole, and to so improve portions of the system and process as to make it possible to reduce the power requirements heretofore necessary in respect to such portions.

More specifically, it is an object of the invention to decrease the cost of production by increasing the yield in the product desired.

A still further object in respect to reduction in the costs is the simplification of the apparatus and its control, whereby the initial plant investment and the cost of operation and maintenance are reduced.

I obtain the foregoing, together with such other objects and advantages as may hereinafter appear, or are incident to my invention, by means of a process and apparatus illustrated in the accompanying drawing, wherein—

The figure is a schematic view, partially in section, illustrating one form of apparatus for carrying out my invention.

Referring to the process and apparatus generally, and, assuming that the plant is to have a capacity of approximately five tons of oxygen per day, approximately five hundred cubic feet of air per minute (measured at zero centigrade and under one atmosphere absolute) are compressed to approximately six atmospheres absolute (73.5 pounds gage) in a compressor. This compressed air enters the warm portion of an interchanger unit indicated, as a whole, by the reference character A, and hereinafter to be more particularly described. The air enters at about plus 30° centigrade, and is cooled to about minus 165° centigrade by the components previously separated.

The compressed air then enters an exchanger B where its temperature is lowered to the point of condensation, and some condensation occurs.

The compressed air (together with such condensate as may have been formed in the exchanger) then enters the bottom tube section $c$ of a rectifying column indicated, as a whole, by the reference character C. The compressed air thus admitted is caused to bubble through the liquid accumulated in the bottom tube section in order to promote the attainment of phase equilibrium, and thus secure an oxygen rich liquid.

According to the best practice of my invention, I compress a large amount of air in excess of that which is to be rectified, and about one half of the compressed air entering the bottom tube section of the rectifier leaves the upper end thereof as very rich nitrogen vapor (approximately 99% nitrogen). The other half of the air compressed, i. e., that portion which is to be rectified, collects in the bottom tube section as very rich oxygen liquid (approximately 40% or more oxygen). This oxygen rich liquid is separated within the rectifier, to which end it is throttled (to 1 atmosphere gauge, or less) into the tray section $d$ of the rectifier by the throttle $e$. The throttling reduces the temperature of the compressed air to about minus 185° centigrade, and, because of the throttling, some vapor is formed.

Rough separation is effected within the tray section which has a sufficient number of trays equipped with bubbling caps, or the like, to accomplish this rough separation. Liquids trickle downward from tray to tray in the tray section, and vapors pass upwardly from tray to tray, bubbling through the liquids collected on the trays. For rough separation, I prefer the tray section as best adapted for securing such rough separation.

However, to effect complete separation with tray rectification, an infinite number of trays would have to be employed, both above and below the inlet, which, of course, is a practical impossibility, and, hence I provide an intermediate tube section $f$ and a bottom tube section $c$ below the tray section $d$; and an upper tube section $g$ above the tray section of the rectifier. These tube sections perform a new and double function in that they constitute rectifying sections, as well as reflux fluid creating sections.

Liquid collecting in the bottom of the tray section overflows into the tubes of the tube section $f$ and trickles down such tubes, which are provided with whirler strips to keep the liquid trickling down in intimate contact, and in approximate phase equilibrium with the vapors passing upwardly through said tubes. Exchange of heat occurs between the fluid in the tubes of this section with the nitrogen rich air taken from the upper end of the bottom tube section and delivered into the lower part of the middle tube section by the connection $h$. The fluid within the tubes of the middle section abstracts heat from the nitrogen rich vapor around the tubes.

The liquid which discharges from the tubes of the middle tube section enters a mixing chamber $i$ (somewhat like a tray section) which functions to thoroughly mix the liquid discharging. From this mixing chamber or space the mixed liquid overflows into the tubes of the bottom tube section $c$, which are also provided with whirler strips for keeping the vapors which rise therethrough in intimate contact, and in approximate phase equilibrium with the liquids trickling down therethrough.

The fluids passing down through the tubes of the bottom tube section are in heat exchanging relation with the compressed air entering such section from the exchanger B, and abstract heat from such compressed air.

Thus, it will be seen that heat is being added to the fluid undergoing rectification from the bottom of the tray section to the bottom of the lower tube section.

Practically pure oxygen liquid is discharged from the tubes of the bottom section into the pot or collecting chamber $j$.

The vapors rising through the rectifying column eventually leave the tray section and enter the tubes of the upper tube section, where refrigeration is applied to rectify and purify the vapors. The tubes of this section are also provided with whirler strips to keep the counterflowing vapors and liquids in intimate contact and approximate phase equilibrium.

The liquid oxygen collecting in the compartment $j$ is throttled from the pressure of rectification into the exchanger B at a pressure slightly above atmospheric, and it is vaporized in the exchanger and is led back through the interchanger by the pipe $k$, passing through the interchanger in heat exchanging relation with the downcoming compressed air. The nitrogen vapor collecting in the top of the column is similarly passed through the interchanger by means of the connection $l$ in heat interchanging relation with the downcoming compressed air.

The excess air compressed is utilized to supply the refrigeration added to the column above the top of the tray section. To this end the liquids collecting in the bottom of the middle tube section around the tubes thereof is throttled (to slightly above atmospheric pressure) by means of the throttle $m$ into the bottom of the upper tube section, in which it is boiled off, the vapors passing back through the interchanger in heat transferring relation with the compressed air by virtue of the connection $n$. Vapor from around the tubes of the middle tube section passes into the vaporizer $o$ of the external cycle of refrigeration D by means of the connection $p$. Here the vapor is cooled down and condensed by imparting heat to liquid formed in the liquefier $q$ of the external cycle and throttled (to slightly above atmospheric pressure) into the vaporizer by the throttle $r$. The nitrogen rich vapor condensed in the vaporizer is led to the bottom of the middle tube section, and the vapor boiled off in the vaporizer by the interchange of heat therein passes back through the liquefier $q$ of the external cycle in heat exchanging relation with the downcoming fluid of such cycle.

The external cycle supplies the amount of refrigeration required to make up for heat leak into the system and for warm end loss.

Before considering the advantages of the process generally, certain of the parts of the apparatus and their function will be treated of, as thereby a better understanding of the whole process can be obtained.

Referring to the interchanger mechanism for cooling the downcoming stream and warming up the return stream, it will be seen that the interchanger is split up or divided. There are two short interchanger sections $s$—$s$ which are connected in parallel by the connections shown, so that they may be reversed, and there are two sections $t$, $t$ (which could be made in one section, but which are divided for reasons which will appear). The two sections $t, t$ are in series with each other, and remain permanently in the circuit, the first of these sections being connected so as to be in series with either of the sections $s$ which happens to be in circuit.

The reasons for providing such an arrangement are as follows: Taking advantage of the fact that the objectionable formation of condensate and ice occurs in the region of an interchanger wherein the air enters, I separate this part of the interchanger from the balance of the interchanger, providing two short reversible interchanger units. In the standard arrangement of interchangers consisting of only two units arranged in parallel, when the units are switched over, that unit which receives the gas which has passed through the other unit containing the ice has been warmed to room temperature, and, although there is some drop in temperature of the gas passing through said other interchanger unit, there is little net lowering in temperature, in consequence of which the gas delivered to the rectification unit is relatively warm, and immediately affects the rectification cycle, disturbing operating conditions, using up refrigeration, and increasing the power requirements appreciably. The disturbance of the rectification process in turn affects the purity of the product, and thus both with respect to operation and purity of product, continuity or uniformity in conditions is destroyed. These conditions maintain until the interchanger unit is brought down to operating temperatures, and, of course, these conditions are again set up when reversal is again necessitated by the formation of ice.

By dividing the interchanger and providing two short reversible lengths in the region where objectionable ice formation occurs, these difficulties are avoided.

Furthermore, there is an appreciable amount of refrigeration stored in the metal of the interchanger (in standard apparatus) which has been switched out of circuit. This refrigeration is lost in the process of warming up to room temperature. By my improved arrangement, that portion of the interchanger apparatus in which there is refrigeration stored in the metal at low temperature is always in circuit, and, thus, this refrigeration is not lost, as is ordinarily the case.

In addition, the arrangement which I provide is one which is calculated to increase the thermodynamic efficiency, because there is a minimum temperature difference between the downgoing and returning streams in the interchanger, in contradistinction to the standard arrangement of interchangers above described, wherein, of necessity, there must be a wide difference of temperature occurring when reversing takes place.

Thus, the interchanger arrangement shown and described tends to produce ease and simplicity of operation, and reduces any fluctuations in the system to a minimum, so that there is no appreciable effect on rectification and purity of product when reversal occurs, and the power requirements are kept at a minimum.

On reference to the drawing, it will be noted that the reversible units of the interchanger are suspended from their top portions, while the remaining sections of the interchanger are supported from their lower portions. The connections between the reversible portions of the interchanger and the portion continuously in circuit are, therefore, at the points of support, and, consequently, no difficulties are encountered from expansion and contraction. Similarly, insofar as each general unit of the interchanger is concerned, expansion and contraction from and towards the point of support is provided for. The column is supported at about its middle approximately in line with the interchanger supports, so that expansion and contraction take place toward and from the ends.

That portion of the interchanger continuously in circuit is preferably divided into the two sections $t, t$ above mentioned, the halves, taken with their appropriate connections, being arranged in the form of an inverted U which reduces the overall height of building required to house the installation, shortens the connections between the end of the interchanger and the rectifier, and, therefore, minimizes heat leak. Furthermore, this arrangement results in substantial equalization in the pressure drop from the lower portion of the rectifier to the end of the interchanger, and from the upper portion of the rectifier to the end of the interchanger.

Obviously, this interchanger arrangement may be advantageously substituted for the standard interchanger arrangement in any one of the commercial forms of liquefaction apparatus now in use.

Referring now to the exchanger B (comprising a group of tubes with surrounding casing), one of its primary purposes is to set up conditions whereby the interchanger, on the one hand, and the rectifier, on the other hand, may exercise their functions to the best advantage, thermodynamically, and otherwise. In its relation to the interchanger, the exchanger functions to vaporize the pure oxygen liquid taken from the pot $j$ at the bottom of the column, whereby the oxygen returns through the interchanger in vapor form. With the oxygen in this form, a small pressure, indeed, will suffice to cause the vapor to flow through the interchanger, whereas, if the oxygen had to be raised to the interchanger in liquid form, considerable pressure would be required. This increase in pressure would be reflected throughout the entire system, causing a corresponding increase throughout which, of course, would not only increase the power requirements, but would work disadvantageously, insofar as the process, generally, is concerned. Considering that the fluid being cooled in the interchanger is in vapor form, it is highly advantageous, from a thermodynamic standpoint, that the cooling fluid returning through the interchanger should also be in vapor form. The exchanger ensures this. Furthermore, the exchanger is, in substance, a plain pot for boiling off the oxygen liquid, and it is desirable for this boiling operation to have such a plain pot, rather than do the evaporating in the small tubes of the interchanger.

With respect to the downcoming stream of compressed air, the exchanger functions to additionally lower the temperature of the gases leaving the interchanger to the point of condensation, and appreciable condensation occurs in the exchanger. In the rectifying column there is, and should be, only a continuous mixing of vapors and liquids, both in the fluids undergoing rectification, and in the fluid employed to add and abstract heat in the column. Where such mixture is occurring, it is advantageous, from the standpoint of thermodynamic efficiency, that the vapors and liquids should be at approximately the same temperature, for, otherwise, appreciable thermodynamic losses will ensue from the mixing of fluids of widely different temperature. The exchanger functions to introduce vapor and liquid into the rectifying column at substantially the same temperature as the liquids accumulating therein.

In ordinary systems, liquid oxygen must be repeatedly withdrawn in substantial amounts, in order to free the system of accumulated hydrocarbons. By providing the exchanger for vaporizing the liquid oxygen derived, these hydrocarbons are being continually withdrawn with the oxygen liquid, and are largely vaporized in the exchanger and passed through the interchanger and out of the system. It is necessary only at relatively long intervals to withdraw small quantities of liquid from the exchanger to remove any accumulation of hydrocarbons that may occur therein. The amount of oxygen lost is, thus, materially reduced, and the amount of refrigeration lost is similarly cut down.

Of course, the exchanger functions to recover refrigeration in the oxygen liquid as the heat to effect the boiling of the oxygen is abstracted from the gases leaving the interchanger and passing through the exchanger into the bottom tube section.

The exchanger also provides a place in the system for the evaporation of the liquid oxygen at a pressure slightly above atmospheric, and, thus, no vacuum is required for the withdrawal of the oxygen produced.

Furthermore, for the heat exchange within the rectifier, the gases to be separated must be compressed to such a pressure that their temperature of liquefaction is above the temperature of oxygen boiling under the rectification pressure; therefore within the exchanger their temperature is sufficiently above the temperature of oxygen evaporating at atmospheric pressure, or slightly above, so the temperature difference is sufficient to produce heat transfer. As but a slight amount of heat must be removed from the compressed gas to reduce its temperature from that leaving the interchangers to the temperature of liquefaction, most of the heat removed in the exchanger is to produce liquefaction at substantially constant temperature. The evaporation of the liquid oxygen occurs at substantially constant temperature, so that the curves of temperature heat relation for each fluid are substantially parallel and fairly close together.

If no exchanger were provided, but the liquid oxygen were evaporated in the top of the rectifier to provide some of the refrigeration required for rectification, it would be necessary to rectify under a pressure sufficiently high to produce the desired heat transfer. In the process, as proposed, the liquid employed to provide refrigeration in the top of the rectifier is very rich in nitrogen. Evaporating under approximately atmospheric pressure, its temperature of evaporation is much lower than that of substantially pure oxygen, evaporating under the same pressure. To secure the desired heat transfer, a rectification pressure is permissible with the arrangement shown, which is much lower than would be possible if it were attempted to recover the refrigeration of the liquid oxygen by evaporating it in the top of the rectifying column.

From a thermodynamic efficiency standpoint, it will be seen that in the interchanger, on the one hand, neither fluid should be changing state, whereas, on the other hand, in the rectifying column there should be a continuous change from vapor to liquid and liquid to vapor. The provision of the exchanger intermediate the interchanger and the rectifying column ensures that these conditions are maintained, respectively, in both interchanger and rectifier, and, consequently, each of these functions to the best advantage.

The providing of an exchanger for the purposes above described also results in a simplifying of the operation of the system as a whole. By withdrawal of the oxygen in liquid form the pressure of rectification is not affected by the rate of such withdrawal; consequently, the pressure of rectification is determined wholly by the rate of withdrawal of nitrogen vapor from the top of the column.

The rate of nitrogen vapor withdrawal as controlled by an automatic pressure relief valve U placed in the outlet pipe returning from the interchangers. The control chamber of this automatic pressure relief valve may be connected to the top of the rectifier, so that the operation of this valve is determined solely by the rectification pressure, unaffected by pressure drop of the nitrogen vapor returning through the interchangers.

With a given operating capacity, the purity of the oxygen and nitrogen produced will depend upon the pressure of rectification. A lowering of the rectification pressure will decrease the temperature difference in the top of the rectifier, and, consequently, decrease the heat transfer from the refrigerating fluid to the fluid undergoing rectification. This will result in a less pure nitrogen vapor leaving the top of the rectifier. On the other hand, if the pressure of rectification is increased, the temperature difference will be increased, and the imparting of refrigeration will be increased, resulting in a greater purification of the nitrogen vapor. Consequently, the purity of the nitrogen vapor may be regulated by varying the pressure of rectification, and will be maintained constant if the pressure of rectification is kept constant. The purity of the oxygen liquid collecting in the pot at the bottom of the column will vary with the purity of the nitrogen vapor leaving the top of the column, but in a reverse manner. The purity of the oxygen produced may thus be controlled by the rectification pressure, an increased rectification pressure giving a less pure oxygen product and a lower rectification pressure producing oxygen higher in purity.

This relation between the purity of the products and the rectification pressure holds true when the column is operating at a given capacity. A variation in the capacity will also affect the purity of the products, even when the pressure of rectification is maintained constant. Thus, if the capacity is decreased, that is, the rate of rectification is decreased, there should be a corresponding decrease in the refrigeration imparted in the top of the column to the fluid undergoing rectification. If the rectification pressure is maintained constant when the capacity is decreased, the refrigeration imparted to a unit of the fluid undergoing rectification will be increased, because the same temperature difference will obtain between the refrigerating fluid and the fluid being rectified, and, consequently, the same quantity of heat will be transferred through the heat transfer surfaces, but this heat will be imparted to a smaller amount of fluid undergoing rectification. Consequently, the purity of the nitrogen produced will be increased, while that of the oxygen produced will be correspondingly decreased.

In order to maintain a constant purity of the products of rectification as the capacity is changed, there should be a corresponding change in the pressure of rectification. This variation in rectification pressure may be obtained in several ways. It may be obtained by employing an automatic pressure relief valve $u$ of such operating characteristics that the pressure regulated will vary in the desired way with the rate of flow of vapor through the valve, the control chamber being connected, as shown, directly to the rectifier top.

In any of the above mentioned situations, however, it will be seen that the operating conditions of the system are automatically maintained by a single automatic pressure relief valve on the outlet pipe for the vapor product of the rectifier, if the liquid product of the rectifier is removed in liquid form. In existing systems where the liquid product of rectification is vaporized within the rectifier and removed therefrom in vapor form, the pressure of rectification is dependent not only upon the control of the flow of nitrogen produced, but also upon the control of the flow of the oxygen produced. Any manipulation of either control affects the operation of the rectifier as a whole. The provision of an exchanger whereby the oxygen may be removed in liquid form and its refrigeration recovered therein, makes possible not only a simple control of operating conditions, but also an automatic control for continually producing products of desired purity, irrespective of variations in capacity of operation. Minimum attention of the operator is required.

Referring now, again, to the tray section, large changes in the composition of both the liquid and the vapor streams in counterflow occur from tray to tray, particularly at certain trays within the section, and a fair degree of purity of the liquid leaving the bottom of the tray section and the vapor leaving the top of the tray section is obtained. There is very little change in the volume flow of these fluids throughout the tray section, so that liquid, in large quantities, enters the tubes of the tube section below the inlet, and vapor in large amounts enters the tubes of the upper tube section. No heat is imparted, nor refrigeration provided, within the tray section, except such small almost negligible, quantity of heat which leaks in through the surrounding insulation. It is not desired to impart or abstract heat within the tray section, as such would defeat the object of this portion of the rectifier in accomplishing a large part of the separation desired. The separation from tray to tray would be less with heat exchanged than without such exchange.

It has been mentioned that the rougher stages of separation are accomplished within the tray section. Where the fluids are in a very low degree of purity, a very large change in purity takes place from tray to tray. However, when the fluids have reached a fairly high degree of purity, the change in purity from one tray to another is very small. Consequently, a few trays in the first stages of rectification produce a very great separation of the products desired, while many trays would be required in the final stages of separation in order to reach a high purity of products. The tube sections hereinbefore referred to act like an infinite number of trays, and are thus desirable for the final stages of purification. The whirler strips previously referred to consist of a thin copper ribbon twisted and introduced within the tube, pressing against the walls so as to provide two helical passageways. The downflowing streams of liquid tend to flow out towards the circumference of the tube, and are thus brought into direct contact with the heat transferring surface. The liquids also being spread out upon the surfaces of the whirler strips, a large surface is exposed to the rising stream of vapor, and, thus, the liquid and vapor streams are brought into intimate contact with each other continuously throughout the whole of each tube length, and heat is imparted or abstracted throughout the tube length.

It will be noted that the inlet to the tray is below the middle. There is, thus, a greater number of trays above the inlet where small change in composition is to take place, which is contrary to the usual method of constructing rectifiers. I have discovered that there are a number of factors determinative of the improved arrangement, among which I may mention the following. While the oxygen is the smaller component of the entering mixture, greater changes take place in the composition of the smaller component from tray to tray than in the composition of the nitrogen—the larger component—from tray to tray. Also, to obtain a high yield of the lesser component, a high purity of the larger component must be obtained. By providing a larger number of trays above than below the inlet, I obtain a high yield as well as a high purity of the lesser component. In addition, in the arrangement shown, there are two tube sections below the tray section while there is but one above. Also the tube sections (below the trays) evaporating liquids are relatively more effective than the tube section (above) condensing vapors.

In the forms of rectifiers heretofore used, it has been customary to produce the refluxes of vapor and liquid, respectively, by boiling the liquid collected in the bottom of the column, and by condensing vapor in the top of the column, or by introducing a reflux liquid in the top of the column. No attempt has been made to carry the rectification of the fluids into those portions of the rectifier where heat has been imparted or extracted. In the rectifier shown, the rectification is continued into the portions of the column where heat is being added or abstracted, so that practically the whole length of the column is effective in producing separation.

Not only is the purity of the products dependent upon the actual construction of the rectifier, such as here described, for producing as high purity as possible, but I have found that with a given construction, the purity is also affected by the total amount of refrigeration imparted in the top of the rectifier, and by the heat imparted in the bottom of the rectifier. There are theoretically minimum values of this refrigeration and heating which are necessary to produce a given amount of separation with an infinite number of trays. In order to actually accomplish this separation, however, it is necessary to impart more than these theoretically minimum values, and the greater the excess over the minimum, the more nearly will the desired purity be reached.

The column shown is arranged and proportioned not only to provide, by compressing more air than is to be rectified, a sufficient quantity of liquid refrigerant to produce the theoretical minimum of refrigeration in the top of the column, but also a great excess of refrigeration by compressing a considerable excess of air over that to be rectified, and the column provides means for liquefying the portions to be rectified and utilized for refrigeration in separate compartments. Thus, there is provided not only an excess of refrigeration in the top of the column, but an excess of heating in the bottom of the column. This excess of refrigeration and of heating provides a great excess of the reflux liquid and vapor, respectively, which results in the attainment of the desired high purity of products.

However, it will now be pointed out that the two liquids obtained by liquefying the air compressed are not of the same composition, that is, of the original composition of the atmosphere. If this were to obtain, there would be a large loss of oxygen in the excess air compressed for refrigeration, that is, the oxygen obtained by rectification within the column would be but one half or less than the oxygen contained in the air compressed. The condensation of the air is carried out in such a way as to retain most of the oxygen in the liquid to be rectified, that portion of the liquid to be used for refrigeration containing but little oxygen. This results in a much higher yield of oxygen relative to that in the total air compressed. This result is obtained by the construction illustrated, of the two lower tube sections.

The middle tube section contains a sufficient amount of tubes to properly care for the liquid flowing down from the tray section. About one half of this liquid is evaporated within the tubes of this tube section. The reduced quantity of liquid reaching the lowest tube section may, therefore, be properly cared for by a considerably less number of tubes. However, it is desired to condense, within this bottom tube section, approximately the same amount of vapor as around the tubes of the middle tube section. In order to accomplish this, it is necessary to provide nearly the same amount of heat transferring surface within the bottom tube section as within the middle tube section. This is done by making the bottom tube section longer than the middle tube section.

The obtaining of an oxygen rich liquid in the bottom tube section is accomplished by two means. First, the compressed air, slightly liquefied, which enters this tube section, is caused to bubble through the liquid accumulated therein. This tends to bring the vapor and liquid into phase equilibrium. Liquid and vapor in phase equilibrium, under the circumstances, means that the liquid is of much higher oxygen content than the vapor. Second, the production of an oxygen rich liquid is promoted by the down-flow of condensed vapor on the tubes in the bottom tube section as the rising vapor is condensed thereon. The rising vapor thus becomes richer in nitrogen as it flows up around these tubes, and the longer the tubes, the greater the tendency to produce higher purity of nitrogen. To promote intimacy of contact of vapor with liquid the space around the tubes may be filled with Lessing rings or other packing material. The nitrogen rich vapor which leaves the top of the bottom tube section, amounting to about one half of the air compressed, enters the middle tube section slightly above the liquid level it is desired to maintain therein. Passing up around the tubes this vapor is condensed in imparting heat for rectification of the fluid within the tubes, and the liquid accumulates within this tube section.

It is here that the refrigeration from the external cycle is applied to the main cycle in order to balance the heat leak and warm end loss in the main cycle. From the top of the middle tube section vapor is led over to the vaporizer. This vapor is very high in nitrogen content, because of the separation that has occurred within the middle tube section, due to the down flow of liquid on the tubes, in counterflow to the rising vapor around them. The vapor withdrawn also contains a high portion of certain of the rare gases of the atmosphere, such as neon. These vapors enter the lower portion of the vaporizer and pass up through tubes therein, being liquefied by the evaporation of a liquid refrigerant around the tubes. The liquefied portion flows down within the tubes and back to the middle tube section through a tube provided for the purpose. From the top of the vaporizer a small pipe is led, and a small amount of vapor is continuously withdrawn therethrough. This vapor is rich in such of the rare gases of the atmosphere as neon, which are more volatile than nitrogen, and separation of them may be effected in apparatus not shown.

The liquid from the middle tube section is throttled to approximately atmospheric pressure, and introduced around the tubes in the top tube section, where it evaporates to produce the refrigeration for rectification. Since this liquid is very rich in nitrogen, a large quantity of it may be used for such refrigeration purposes, without an excessive loss of oxygen. This large amount of refrigeration, as compared to the quantity of liquid throttled from the bottom tube section to within the rectifier, affords a very large reflux of liquid to promote separation of the constituents during rectification. Also, as compared with the quantity of liquid introduced into the rectifier, a very large quantity of vapor is condensed within the two tube sections below the rectifier inlet, thus providing a very large reflux of vapor to promote the rectification process. Finally, since the liquid to be rectified is one much richer in oxygen than atmospheric air, it is possible to secure a higher purity of both oxygen and nitrogen at the same time. Thus, we can say that this rectifier construction, and the process employed therein, accomplishes a greater yield of either constituent of given purity by providing, for rectification, a fluid better suited to complete separation, and by providing the excessive amounts of heating and refrigeration which promote complete separation.

Thus, while the excess air compressed, in a sense, represents additional power consumed, the advantage derived in purity and yield of product more than compensates for this power, in consequence of which the net cost of production is lower than in standard practice.

The refrigeration supplied by the external refrigeration cycle to balance the heat leak and warm end loss in the main separation cycle is applied in the vaporizer at the location shown, in order to facilitate the operating of the plant as a whole.

During the operation of the plant the amount of this refrigeration required may vary, due to a change in the room temperature, which affects the rate of heat leak into the apparatus, to a change in the warm end loss of the main cycle, due to increased temperature difference, with poorer heat transfer in the separation interchangers, due to accumulation of ice and snow on the tubes, or to a loss in accumulated refrigeration at the time of changing over the interchangers, or to a gradual change in the refrigeration accumulated in the metal and insulation of the apparatus as the plant reaches steady operating conditions after starting. If no change has been made in the conditions of operation of the external cycle, these changes of conditions in the main cycle will be manifested by changes in the quantity of liquid accumulated in the system. During normal operation of the system the valves are manipulated to maintain the liquid levels as constant as possible. With the arrangement shown, the liquid level that will gradually change under such circumstances is that of the liquid refrigerant accumulated in the liquefier of the external cycle. As soon as this change is noted, the speed of the expansion engine may be modified by changing its load, or the speed of the refrigerating compressor may be changed to bring the liquid level mentioned back to normal. Since the change occurs only in the external cycle, the conditions of heat transfer within the main cycle, particularly within the rectifier, remain constant, with a consequent constant operation and purity of products.

There is a further advantage of applying the refrigeration in the vaporizer as located in that this refrigeration from the external cycle produces a liquid refrigerant which is throttled into the top tube section, and, by evaporation, adds to the refrigeration imparted for rectification. This refrigeration from the external cycle, in amount, is equal to the heat leak into all parts of the main separation cycle, and to the warm end loss, due to temperature difference, within the interchanger. With the exception of the heat leak into the rectifier above the inlet, these losses produce a corresponding inflow of heat into the rectifier below the inlet, evaporating the fluid undergoing rectification, and thus increasing the vapor reflux. Thus, the refrigeration from the external cycle is, in the main, applied to the rectifier above the inlet in order to balance losses, producing heat added to the fluid in the rectifier below the inlet. This method of balancing these losses adds to the refluxes of liquid and vapor, respectively, and, thus, tends to improve the purity of the product.

In the practice of my invention, as above described, I may readily produce ninety-nine percent oxygen liquid and ninety-nine percent nitrogen vapor. It will be seen, therefore, assuming that the apparatus is being operated as an oxygen producing plant, that a very greatly increased yield is obtained over that obtained in standard systems and apparatus. This increased yield, of course, results in a lowering of costs.

Referring, now, to the external cycle, I prefer to use nitrogen as the refrigerating medium. This nitrogen is preferably compressed to about 353 pounds gage (25 atmospheres absolute) and introduced into an interchanger apparatus E of the same general arrangement as that previously described. This nitrogen is advantageously derived from the air being compressed, to which end I lead the nitrogen vapor, which has been vaporized in the top of the rectifier and passed through the interchangers to the compressor (not shown) of the external cycle. This nitrogen vapor is the "excess" air of the main cycle heretofore described.

Two short interchangeable units $s'$, $s'$, are provided, and in series with either thereof is an interchanger section $t'$ continuously in circuit, and in series with this is a liquefier $t^2$ also continuously in circuit. The nitrogen is cooled to about $-130°$ centigrade in the sections $s'$ and $t'$, and approximately about 82% passes to the expansion engine $v$, and the remainder to the liquefier $t^2$. The liquid formed in the liquefier is, as before stated, throttled into the vaporizer, where it is boiled off, the vapor and the exhaust from the expansion engine returning together through the liquefier, and the cold and warm interchanger sections in series, in which it is warmed to nearly room temperature before being recompressed.

It will be observed, as, for example, by comparison with the length of the rectifying column, that the interchangers are quite long. In fact, they are much longer than it is the practice to make them. This great length of the interchanger is of importance in reducing the thermodynamic losses, as will have become apparent in the previous description of the general process. For example, the length of the interchanger is of importance in bringing the temperature heat curves of the downcoming and returning streams close together. I prefer to employ interchanger tubes, the relation of length to internal diameter of which is approximately 2000 to 1, that is to say, assuming that we had a single tube extending from the point of compressed air inlet to the point of discharge of the same from the interchanger, its length would be about 2000 times its internal diameter. I prefer to use interchanger tubes of about 1/5" internal diameter.

It will also be noted that a valve or throttle may be provided in the tube $h$ of the rectifying column in order that, if desired, regulation of the relative pressures obtaining within the tube section $c$ and the tube section $f$ may be had. Manipulation of this throttle would result in regulation of the relative quantities of the liquids collecting in the bottom portions of the said two tube sections. The valve of this is indicated, for example, by the following. If it is desired to increase the yield of oxygen, this valve may be operated to decrease the amount of oxygen lost in the vapors flowing from the upper end of the tube section $c$ into the tube section $f$.

It will, of course, be understood that the automatic pressure relief valve is adjustable.

While I have described the compressing of all of the air by one compressor, if desired, the air to be rectified and the excess air may be separately compressed.

It will be seen that the above described process has been devised to minimize the power required for compressing the air or other mixed gases to be rectified.

Thus, the more volatile constituent, nitrogen in the case of air, is utilized as the refrigerant to be evaporated around the tubes in the tube section at the rectifier top. This evaporation takes place at a pressure only sufficiently above that of the atmosphere to overcome the pressure drop in returning through the interchanger and connections. The pressure of the fluid undergoing rectification within the tubes must be higher than that of the refrigerant evaporating around the tubes in order to secure the heat transfer from the more volatile constituent of the gases being rectified to the more volatile constituent being utilized as the refrigerant. For this purpose, the pressure of rectification may be as low as approximately 1½ atmospheres absolute (½ atmosphere gauge), although the rectifier may be designed to require as high as 4 atmospheres absolute (3 atmospheres gauge).

To impart the heat for rectification, the air or other mixed gases, around the tubes in the lower tube sections of the rectifier is compressed to such a pressure that they will be liquefied in evaporating the fluid undergoing rectification. During the liquefying of the compressed gases as they flow upwards around the tubes, the less volatile constituent is removed at a relatively more rapid rate than the more volatile constituent, thus causing a drop in the temperature of liquefaction from the lower to the upper end of these tube sections. On the other hand, the fluid undergoing rectification must receive heat at higher and higher temperatures as the liquid flows downward within the tubes. Consequently, with the compressed gases flowing upward while liquefying in imparting the heat for rectification to the liquid undergoing rectification while it is flowing downward, the temperature heat relations for the two fluids approach to parallelism. This minimizes the pressure difference necessary for heat transfer, and, thus, for a given rectification pressure, permits the use of the lowest possible compression of the gases to be separated. The latter pressure will be in the neighborhood of three times the pressure of rectification, or from 4 to 12 atmospheres absolute (3 to 11 atmospheres gauge) for a rectification pressure from 1½ to 4 atmospheres absolute.

In connection with the foregoing, it is to be noted that using a relatively small number of trays below the inlet of the tray section results in the fluid to be rectified entering the tube sections in a relatively impure state, and, therefore, at a temperature sufficiently lower than that of the less volatile constituent accumulating in liquid form at the lower end of the rectifier, to obtain the temperature heat relation desired.

Generally speaking, my invention fundamentally departs from previous practice in that I am enabled to obtain a separation which, for all practical purposes, is complete, whereas heretofore, using the separation of air into its constituents as an example, the constituents were not completely separated, either oxygen or nitrogen alone being obtained as the product of the process, the other constituent being too impure for commercial purposes. I am enabled to obtain this complete separation of the mixed gas, by virtue of the fact that I add all of the heat required in the lower portion of the rectifier and abstract all of the heat required in the upper portion of the rectifier to effect this complete separation. The addition and the abstraction of all of the heat required for complete separation produces the refluxes necessary to effect complete separation. By compressing more of the gas than is to be rectified, I furnish the heat and refrigeration and the required amount of refluxes to accomplish the desired result.

I claim:—

1. In the rectification of mixed gases, the compressing of materially more gas than is to be rectified, the extracting of one of the constituents thereof in a relatively pure state, and the utilization thereof as a refrigerant producing liquid refluxes in the rectification of the remainder and the subsequent cooling of said extracted constituent in a refrigerating cycle external of the main cycle to a temperature suitable for use in producing refluxes in the rectification of the remainder.

2. In a rectification system in which excess refluxes of vapor and liquid respectively are produced by compressing materially more gas than is to be rectified, the step of extracting a constituent of the gas in a relatively pure state and utilizing the said constituent to produce a portion of said excess refluxes and in creating further refluxes by applying an external cycle of refrigeration to said extracted constituent after said utilization and utilizing said cooled constituent to balance heat leak, in such manner as to create said further refluxes.

In testimony whereof I have hereunto signed my name.

WILLIAM L. DE BAUFRE.

CERTIFICATE OF CORRECTION.

Patent No. 1,830,157.  Granted November 3, 1931, to

WILLIAM L. DE BAUFRE.

It is hereby certified that error appears in the printed specification of the above numbered patent requiring correction as follows: Page 5, line 1, for "as" read is; page 9, line 100, claim 1, strike out the words "producing liquid refluxes"; and that the said Letters Patent should be read with these corrections therein that the same may conform to the record of the case in the Patent Office.

Signed and sealed this 17th day of May, A. D. 1932.

(Seal)

M. J. Moore,
Acting Commissioner of Patents.